(12) United States Patent
Huang et al.

(10) Patent No.: US 9,252,994 B2
(45) Date of Patent: Feb. 2, 2016

(54) NETWORK APPARATUS AND NETWORK SIGNAL PROCESSING METHOD

(75) Inventors: Liang-Wei Huang, Taipei (TW);
Chih-Yung Shih, Taipei (TW);
Shieh-Hsing Kuo, Taipei County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1768 days.

(21) Appl. No.: 12/260,099

(22) Filed: Oct. 29, 2008

(65) Prior Publication Data

US 2009/0141745 A1  Jun. 4, 2009

(30) Foreign Application Priority Data

Oct. 29, 2007  (TW) ............................... 96140573 A

(51) Int. Cl.
*H04J 3/06* (2006.01)
*H04L 25/14* (2006.01)
*H04L 7/00* (2006.01)
*H04L 25/03* (2006.01)

(52) U.S. Cl.
CPC ............. *H04L 25/14* (2013.01); *H04L 7/0079* (2013.01); *H04J 3/0685* (2013.01); *H04L 7/0029* (2013.01); *H04L 2025/03369* (2013.01); *H04L 2025/03477* (2013.01)

(58) Field of Classification Search
USPC ......................................... 370/503, 298, 465
See application file for complete search history.

(56) References Cited

U.S. PATENT DOCUMENTS

| | | | |
|---|---|---|---|
| 6,192,047 B1* | 2/2001 | Oota | 370/375 |
| 6,738,916 B1* | 5/2004 | Gladden et al. | 713/400 |
| 7,061,903 B2* | 6/2006 | Higuchi | 370/352 |
| 7,154,894 B1* | 12/2006 | Tsukamoto | 370/395.1 |
| 7,236,463 B2* | 6/2007 | Lai | 370/286 |
| 7,724,861 B2* | 5/2010 | Tinker | 375/376 |
| 2003/0061392 A1* | 3/2003 | Chang et al. | 709/250 |
| 2003/0063577 A1* | 4/2003 | Hayward | 370/286 |
| 2004/0120361 A1* | 6/2004 | Yu et al. | 370/545 |
| 2004/0131080 A1* | 7/2004 | Ito | 370/466 |
| 2005/0234928 A1* | 10/2005 | Shkvarchuk et al. | 707/100 |
| 2007/0047121 A1 | 3/2007 | Eleftheriou et al. | |
| 2008/0204090 A1* | 8/2008 | Sleigh et al. | 327/146 |
| 2009/0190549 A1* | 7/2009 | Kim et al. | 370/331 |

* cited by examiner

*Primary Examiner* — Kibrom T Hailu
(74) *Attorney, Agent, or Firm* — McClure, Qualey & Rodack, LLP

(57) ABSTRACT

A network apparatus, for processing a network signal and outputting an output signal, includes an asynchronous signal processing module, a sampling rate converter and a synchronous signal processing module. The asynchronous signal processing module operates in an asynchronous domain, and is utilized for receiving and processing the network signal to generate a first processed signal. The sampling rate converter is coupled to the asynchronous signal processing module, and is utilized for performing sampling rate conversion on the first processed signal to generate the output signal. A first operating frequency of the asynchronous signal processing module is different from a second operating frequency of the synchronous signal processing module.

20 Claims, 3 Drawing Sheets

NETWORK APPARATUS AND NETWORK SIGNAL PROCESSING METHOD

BACKGROUND OF THE INVENTION

1. Field of the Invention

The present invention relates to a network apparatus and network signal processing method, and more particularly, to a network apparatus capable of processing an asynchronous and synchronous signal and a method thereof.

2. Description of the Prior Art

In general, a transmitter (TX) and receiver (RX) need to be in sync with each other. In practice, it is necessary to have a clock generator in the receiver to produce an RX clock signal. In order to synchronize RX with TX, the clock generator in RX adjusts the phase of the RX clock signal according to the signal received from TX until the RX clock signal is locked with the TX clock signal.

The phase of the RX clock signal needs to be constantly adjusted for the purpose of tracking the TX clock signal, however. The value calculated by the system needs to be converged repeatedly due to the unstable phase. This means that the overall system efficiency is greatly reduced.

SUMMARY OF THE INVENTION

It is therefore one of the objectives of the present invention to provide a network apparatus and a network signal processing method thereof, which processes signals in an asynchronous domain via an asynchronous module to increase the overall system efficiency.

According to an exemplary embodiment of the present invention, a network apparatus for processing a network signal and outputting an output signal is disclosed. The network apparatus comprises an asynchronous signal processing module, a sampling rate converter and a synchronous signal processing module. The asynchronous signal processing module is operated in an asynchronous domain, and is used for receiving and processing the network signal to generate a first processed signal. The sampling rate converter is coupled to the asynchronous signal processing module, and is used for performing sampling rate conversion on the first processed signal generated from the asynchronous signal processing module to generate a first converted signal. The synchronous signal processing module is operated in a synchronous domain, and is used for processing the first converted signal to generate the output signal. The asynchronous signal processing module has a first operating frequency, and the synchronous signal processing module has a second operating frequency. The first operating frequency is different from the second operating frequency.

According to an exemplary embodiment of the present invention, a network signal processing method is also disclosed. The network signal processing method comprises: in an asynchronous domain, receiving and processing a network signal to generate a first processed signal; performing sampling rate conversion on the first processed signal to generate a first converted signal; and in a synchronous domain, processing the first converted signal to output an output signal. The asynchronous domain has a first operating frequency; the synchronous domain has a second operating frequency; and the first operating frequency is different from the second operating frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
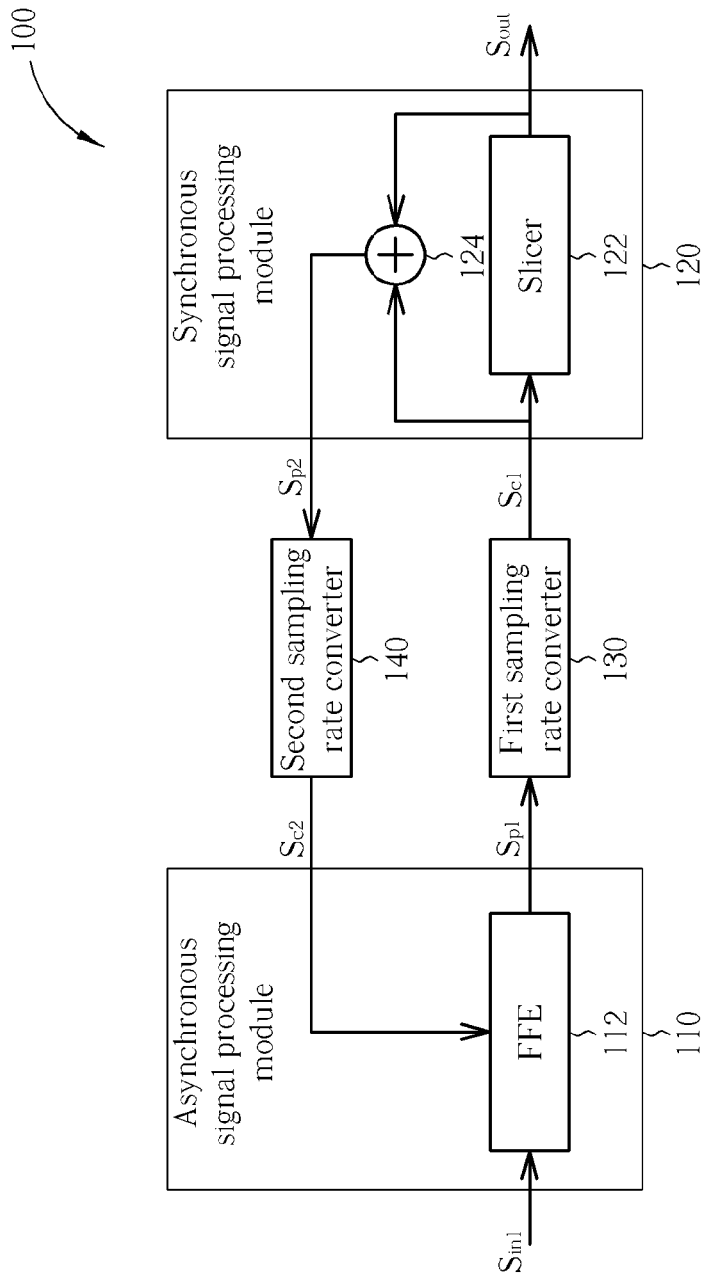
FIG. 1 is a diagram illustrating a network apparatus according to an exemplary embodiment of the present invention.

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connect" is intended to mean either an indirect or direct electrical connection. Accordingly, if one device is coupled to another device, that connection may be through a direct electrical connection, or through an indirect electrical connection via other devices and connections.

Different features of the present invention are detailed as below with reference to the figures, and for convenience of explanation, the same elements in separate figures are indicated by the same reference numerals.

Please refer to FIG. 1. FIG. 1 is a diagram illustrating a network apparatus 100 according to an exemplary embodiment of the present invention. As shown in FIG. 1, the network apparatus 100 comprises an asynchronous signal processing module 110, a synchronous signal processing module 120, a first sampling rate converter 130 and a second sampling rate converter 140. The asynchronous signal processing module 110 is operated in an asynchronous domain having a first operating frequency, and is used for processing a network signal Sin1 to generate a first processed signal Sp1. The first sampling rate converter 130 is coupled between the asynchronous signal processing module 110 and the synchronous signal processing module 120. The first sampling rate converter 130 is used for performing sampling rate conversion on the first processed signal Sp1 generated from the asynchronous signal processing module 110 to generate a first converted signal Sc1 to the synchronous signal processing module 120. The synchronous signal processing module 120 is coupled to the asynchronous signal processing module 110. The synchronous signal processing module 120 is operated in a synchronous domain having a second operating frequency, and is used for processing the first converted signal Sc1 to generate a second processed signal Sp2. The second sampling rate converter 140 is coupled between the asynchronous signal processing module 110 and the synchronous signal processing module 120. The second sampling rate converter 140 is used for performing sampling rate conversion on the second processed signal Sp2 generated from the synchronous signal processing module 120 to generate a second converted signal Sc2 to the asynchronous signal processing module 110, in order to adjust the operation of the asynchronous signal processing module 110. Further description of the operation of the network apparatus 100 is detailed below; this is, however, for illustrative purposes and not a limitation of the prevent invention.

To make the concept of the present invention easily appreciable, it is assumed in this embodiment that the network apparatus 100 is disposed in a 10 G Base-T Ethernet RX. In 10 G Base-T Ethernet standard, the symbol rate (i.e., baud rate) for conveying a signal is 800 MHz. It is also assumed that the sampling rate (i.e., operation frequency) of the analog-to-digital converter (ADC) (not shown in FIG. 1) in the RX is 1 GHz for description. That means using the technology of over sampling the inputted network signal; this is, however, for illustrative purposes and not a limitation of the prevent invention. As shown in FIG. 1, the asynchronous signal processing module 110 comprises a feed-forward equalizer (FFE) 112, which is operated in the asynchronous domain (the operation frequency is 1 GHz), and is used for performing an equalization process on the network signal Sin1 to generate a first processed signal Sp1. The synchronous signal processing module 120 comprises a slicer 122 and an adder 124, which both operate in the synchronous domain (the operation frequency is 800 MHz). The slicer 122 slices the first converted signal Sc1 to generate an output signal Sout, which is then outputted to the next stage circuit (not shown in FIG. 1) coupled to the slicer 122 for processing. The adder 124 performs an operation on the input and output signal of the slicer 122 (i.e., the first converted signal Sc1 and the output signal Sout) to generate a second processed signal Sp2 for adjusting operation of the FFE 112. For example, the adder 124 performs a subtraction operation to calculate the difference between the first converted signal Sc1 and the output signal Sout to generate the second processed signal Sp2. Please note that since the detailed operations of the FFE, slicer and adder are well known to those skilled in the art, further description is omitted here for the sake of brevity. The is operated in the asynchronous domain (the operation frequency is 1 GHz), but both the slicer 122 and the adder 124 are operated in the synchronous domain (the operation frequency is 800 MHz). Thus, the second processed signal Sp2 with 800 MHz frequency has to be converted to the second converted signal Sc2 with 1 GHz frequency via the second sampling rate converter 140 for the FFE 112 to adjust its operation.

Figure 2:
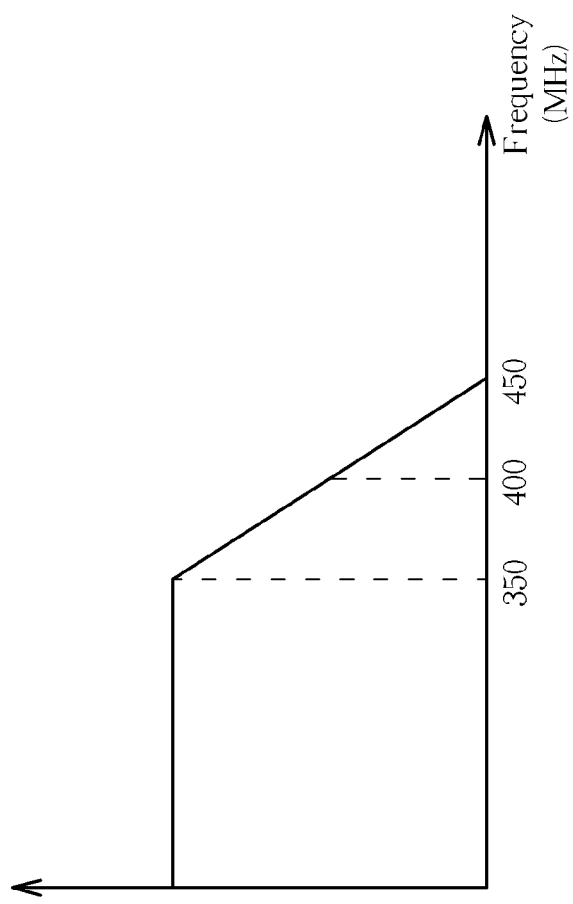
FIG. 2 is a diagram illustrating the frequency characteristic for an output signal of the FFE.

In practice, both the first sampling rate converter 130 and the second sampling rate converter 140 are interpolators, and the second sampling rate converter 140 is a Raised Cosine filter. The Farrow structure is adopted in this embodiment to simplify the design of the network apparatus 100, but other structures are workable. Please refer to FIG. 2. FIG. 2 is a diagram illustrating the frequency characteristic for an output signal of the FFE 112 (i.e., the first processed signal Sp1). In this situation, the cutoff frequency and Beta for the Raised Cosine filter (i.e., the second sampling rate converter 140) can be respectively designed to be 400 MHz and 0.125; these are, however, for illustrative purposes only and are not meant to be taken as limitations of the present invention.

Figure 3:
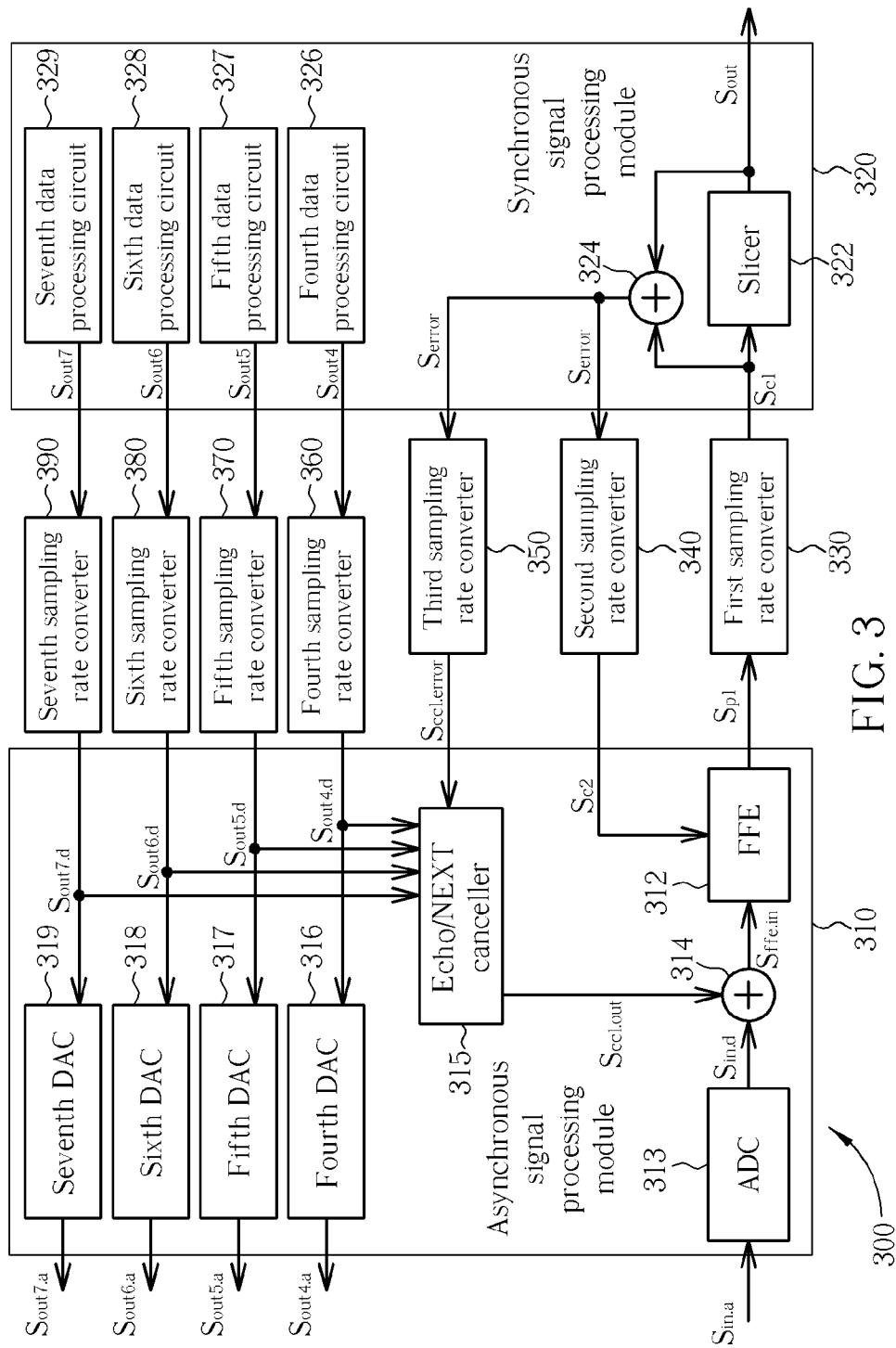
FIG. 3 is a diagram illustrating a network apparatus according to a preferred embodiment of the present invention.

Please note that, in this embodiment, the asynchronous signal processing module 110 comprises the FFE 112, and the synchronous signal processing module 120 comprises the slicer 122 and the adder 124, but this is not a limitation of the present invention. In other words, the asynchronous signal processing module 110 and the synchronous signal processing module 120 can comprise other circuit elements or be implemented by other circuitries. Please refer to FIG. 3. FIG. 3 is a diagram illustrating a network apparatus 300 according to a preferable embodiment of the present invention. To make the concept of the present invention easily appreciable, it is assumed in this embodiment that the network apparatus 300 is disposed in a 10 G Base-T Ethernet RX; however, this is for illustrative purposes only. Similar to the network apparatus 100, the network apparatus 300 comprises an asynchronous signal processing module 310, a synchronous signal processing module 320, a first sampling rate converter 330 and a second sampling rate converter 340. The network apparatus 300 further comprises a third sampling rate converter 350 and fourth, fifth, sixth and seventh sampling rate converters 360, 370, 380 and 390. The asynchronous signal processing module 310 is operated in an asynchronous domain. The synchronous signal processing module 320 is operated in a synchronous domain, and is coupled to the asynchronous signal processing module 310. The sampling rate converters 330-390 are all coupled between the asynchronous signal processing module 310 and the synchronous signal processing module 320.

As shown in FIG. 3, the asynchronous signal processing module 310 comprises not only a FFE 312, but also an ADC 313, a first adder 314, an echo/NEXT canceller 315 and fourth, fifth, sixth and seventh digital to analog converters (DAC) 316, 317, 318 and 318. The synchronous signal processing module 320 comprises not only a slicer 322 and a second adder 324, but also fourth, fifth, sixth and seventh data processing circuits 326, 327, 328 and 329. The third sampling rate converter 350 is coupled between the second adder 324 and the echo/NEXT canceller 315. The sampling rate converters 360-390 are respectively coupled between the data processing circuits 326-329 and the echo/NEXT canceller 315. The DACs 316-319 are respectively coupled to the sampling rate converters 360-390. In the network apparatus 300, the FFE 312, the ADC 313, the first adder 314, the echo/NEXT canceller 315, the sampling rate converters 330-350, the slicer 322 and the second adder 324 are all in an RX of a first transceiver. The fourth data processing circuit 326, the fourth sampling rate converter 360 and the fourth DAC 316 are in a TX of the first transceiver. The data processing circuits 327-329, the sampling rate converters 370-390 and DACs 317-319 are respectively in three TXs, which are not in the first transceiver. Further description of the operation of the network apparatus 300 is detailed below; however, this is for illustrative purposes only and not a limitation of the present invention.

The ADC 313 in the RX of the firs transceiver converts an analog input signal Sin.a into a digital input signal Sin.d with 1 GHz sampling rate. It should be noted that the 1 GHz sampling rate is for illustrative purposes only and is not a limitation of the present invention. In practice, any sampling rate greater than the above-mentioned symbol rate (i.e., 800 MHz), such as 900 Hz or 950 Hz, are workable, that is to say, the ADC 313 has to oversample input network signals. The first adder 314 is coupled to the ADC 313 and the echo/NEXT canceller 315, and is used for performing operations on the digital input signal Sin.d outputted from the ADC 313 and a canceller output signal Sccl.out outputted from the echo/NEXT canceller 315 to generate an FFE input signal Sffe.in. For example, the first adder 314 calculates the difference between the digital input signal Sin.d and the canceller output signal Sccl.out (i.e., removes the noise disturbance indicated by the canceller output signal Sccl.out from the digital input signal Sin.d). The first adder 314 then inputs the FFE input signal Sffe.in to the FFE 312. Please note that because operations and functions of the elements FFE 312, first sampling rate converter 330, slicer 322, second adder 324 and second sampling rate converter 340 of the network apparatus 300 shown in FIG. 3 are similar, respectively, to the elements FFE 112, first sampling rate converter 130, slicer 122, adder 124 and second sampling rate converter 140 of the network apparatus 100 shown in FIG. 1, and further descriptions are not detailed here for the sake of brevity.

The fourth data processing circuit 326 in the TX of the first transceiver is used for generating a fourth output data Sout4 to be outputted via the first transceiver. The other data processing circuits 327-329 are respectively used for generating fifth, sixth and seventh output data Sout5, Sout6 and Sout7 to be outputted via the other three transceivers. The sampling rate converters 360-390 are used for performing sampling rate conversion respectively on the output data Sout4-Sout7 to generate converted (digital) output data Sout4.$d$, Sout5.$d$, Sout6.$d$ and Sout7.$d$. The DACs 316-319 are used for respectively converting the converted (digital) output data Sout4.$d$-Sout7.$d$ into analog output data Sout4.$a$, Sout5.$a$, Sout6.$a$ and Sout7.$a$ for four TXs' transmission.

The input signal received by the RX of the first transceiver is spoilt by echo interference from the TX of the first transceiver transmitting data, and is spoilt by NEXT interference from the TXs of the other tree transceivers transmitting data. Thus, the NEXT canceller 315 has to perform an echo cancellation process and perform a near end crosstalk cancellation process on the digital input signal Sin.d according to the information included in the output data Sout4-Sout7 from the data processing circuits 326-329.

The echo/NEXT canceller 315 is operated in the asynchronous domain (the operation frequency is 1 GHz), but the data processing circuits 326-329 are operated in the synchronous domain (the operation frequency is 800 MHz). Thus, the output data Sout4-Sout7 with 800 MHz have to be converted to the converted output data Sout4.$d$-Sout7.$d$ with 1 GHz respectively via the sampling rate converters 360-390 for the echo/NEXT canceller 315 to generate the canceller output signal Sccl.out in order to perform an echo cancellation process and NEXT cancellation process on the digital input signal Sin.d. In addition, the echo/NEXT canceller 315 has to adjust its operation according to the information included in an error signal Serror (i.e., the second processed signal Sp2 in the network apparatus 100).

In a second case, the echo/NEXT canceller 315 is operated in the asynchronous domain (the operation frequency is 1 GHz), but both the slicer 322 and the second adder 324 are operated in the synchronous domain (the operation frequency is 800 MHz). Thus, the error signal Serror with 800 MHz has to be converted to a canceller error signal Sccl.error with 1 GHz via the third sampling rate converters 350 for the echo/NEXT canceller 315 to adjust its operation.

In practice, the sampling rate converters 350-390 are all interpolators, and the third sampling rate converter 350 is a Raised Cosine filter. A Farrow structure is also adopted in this embodiment to simplify the design of the network apparatus 300. Please refer to FIG. 2 again. In the situation where the frequency characteristic for the first processed signal Sp1 is as shown in FIG. 2, the cutoff frequency and Beta for the Raised Cosine filter (i.e., the third sampling rate converter 350) can be respectively designed to be 500 MHz and 0.1; these values are, however, for illustrative purposes only and are not meant to be taken as limitations of the present invention.

Please note that the asynchronous signal processing module comprises a FFE and an echo/NEXT canceller in the above embodiment, but this is not a limitation of the present invention. In other words, in other embodiments, the asynchronous signal processing module can comprise only an FFE (such as the network apparatus 100), an echo canceller, a NEXT canceller or any combination thereof depending on design requirements.

In the prior art, the equalizer is set in the synchronous domain to perform an equalization process with baud rate, and there will be a problem where the signal to noise ratio (SNR) cannot be optimized. The problem can be overcome by using a fractional-space equalizer, whose operation frequency is a multiple of baud rate. However, in some communication systems, such as a high-speed communication system, multiplying the operation frequency is not allowable. Compared to the prior art, the network apparatus of the present invention is able to perform an equalization process in the asynchronous domain with the help of the first and second sampling rate converters. In this way, if the operation frequency of the equalizer in the asynchronous domain is a little higher than baud rate of received signal, a good SNR can be achieved. Taking the above embodiment as an example, an operation frequency in the asynchronous domain (1 GHz) is 1.25 times the baud rate (800 MHz). In addition, the echo/NEXT cancellation in the prior art is also set in the synchronous domain to perform an echo/NEXT cancellation process. The RX in the synchronous domain has to constantly adjust phase or frequency for the purpose of tracking the clock of the TX, and the echo/NEXT response has to be converged repeatedly. Thus, the overall efficiency of the RX is greatly reduced. Compared to the prior art, the network apparatus of the present invention is able to perform an echo/NEXT cancellation process in the asynchronous domain with the help of the first and second sampling rate converters. Therefore, the RX and TX can refer to the same clock signal, which can be a free-running clock. In this way, the echo/NEXT response does not have to be converged repeatedly, and the overall system efficiency is greatly increased.

Furthermore, when the network apparatus of the prevent invention directly refers to the clock signal from an upper layer, such as a media access control layer or a physical layer, the network apparatus can be regarded as a non-loop timing system; and when the data processing circuits in the network apparatus of the prevent invention take a trigger from the slicer in the same TX as the reference signal, the network apparatus can be regarded as a loop timing system. In this way, the network apparatus of the prevent invention has the flexibility of operating in a non-loop timing or loop timing system, and can be applied to most communication systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network apparatus, for processing a network signal and outputting an output signal, the network apparatus comprising:

an asynchronous signal processing module, operating in an asynchronous domain, for receiving and processing the network signal to generate a first processed signal;

a sampling rate converter, coupled to the asynchronous signal processing module, for performing sampling rate conversion on the first processed signal generated from the asynchronous signal processing module to generate a first converted signal; and a synchronous signal processing module, operating in a synchronous domain, for processing the first converted signal to generate the output signal; wherein the asynchronous signal processing module has a first operating frequency, the synchronous signal processing module has a second operating frequency, and the first operating frequency is different from the second operating frequency.

2. The network apparatus of claim 1, further comprising:
a second sampling rate converter, coupled between the asynchronous signal processing module and the synchronous signal processing module, for generating a second converted signal to the asynchronous signal processing module according to a second processed signal generated from the synchronous signal processing module in order to adjust operation of the asynchronous signal processing module.

3. The network apparatus of claim 2, wherein the asynchronous signal processing module comprises an equalizer, for performing equalization processes on the network signal to generate the first processed signal.

4. The network apparatus of claim 3, wherein the first operating frequency of the asynchronous domain is greater than a symbol rate of the network signal.

5. The network apparatus of claim 2, wherein the asynchronous signal processing module comprises an echo canceller, for performing echo cancellation processes on the network signal to generate the first processed signal.

6. The network apparatus of claim 5, further comprising:
a data processing circuit, operating in the synchronous domain, for generating an output data to be processed via a transmitter; and
a third sampling rate converter, coupled between the data processing circuit and the echo canceller, for performing sampling rate conversion on the output data generated from the data processing circuit to generate a third converted signal and outputting the third converted signal to the echo canceller.

7. The network apparatus of claim 2, wherein the asynchronous signal processing module comprises a near end crosstalk canceller (NEXT canceller), for performing near end crosstalk cancellation processes on the network signal to generate the first processed signal.

8. The network apparatus of claim 7, further comprising:
a data processing circuit, operating in the synchronous domain, for generating an output data to be processed via a transmitter; and
a third sampling rate converter, coupled between the data processing circuit and the NEXT canceller, performing sampling rate conversion on the output data generated from the data processing circuit to generate a third converted signal and outputting the third converted signal to the NEXT canceller.

9. The network apparatus of claim 1, wherein the first operating frequency is greater than the second operating frequency.

10. The network apparatus of claim 1, being disposed in an Ethernet system.

11. A network signal processing method, comprising:
receiving and processing a network signal in an asynchronous domain to generate a first processed signal;
performing sampling rate conversion on the first processed signal to generate a first converted signal; and
processing the first converted signal in a synchronous domain to output an output signal; wherein the asynchronous domain has a first operating frequency, the synchronous domain has a second operating frequency, and the first operating frequency is different from the second operating frequency.

12. The network signal processing method of claim 11, further comprising:
performing sampling rate conversion on a second processed signal generated from the synchronous domain to generate a second converted signal to the asynchronous domain; and
processing the network signal according to the second converted signal.

13. The network signal processing method of claim 12, wherein the step of processing the network signal comprises performing equalization processes on the network signal to generate the first processed signal.

14. The network signal processing method of claim 13, wherein the first operating frequency of the asynchronous domain is greater than a symbol rate of the network signal.

15. The network signal processing method of claim 12, wherein the step of processing the network signal comprises performing echo cancellation processes on the network signal to generate the first processed signal.

16. The network signal processing method of claim 15, further comprising:
generating an output data in the synchronous domain to be processed via a transmitter;
performing sampling rate conversion on the output data to generate a third converted signal; and
performing echo cancellation process on the network signal according to the third converted signal in order to generate the first processed signal.

17. The network signal processing method of claim 12, wherein the step of processing the network signal comprises performing near end crosstalk cancellation processes on the network signal to generate the first processed signal.

18. The network signal processing method of claim 17, further comprising:
generating an output data in the synchronous domain to be processed via a transmitter;
performing sampling rate conversion on the output data to generate a third converted signal; and
performing near end crosstalk cancellation processes on the network signal according to the third converted signal in order to generate the first processed signal.

19. The network signal processing method of claim 11, wherein the first operating frequency is greater than the second operating frequency.

20. The network signal processing method of claim 11, being applied to an Ethernet system.

* * * * *